United States Patent
Xia et al.

(10) Patent No.: US 9,774,432 B2
(45) Date of Patent: Sep. 26, 2017

(54) INTERFERENCE MEASUREMENT METHOD, BASE STATION AND USER EQUIPMENT

(71) Applicant: Huawei Technologies Co., Ltd., Shenzhen (CN)

(72) Inventors: Liang Xia, Shenzhen (CN); Yongxing Zhou, Beijing (CN); David Jean-Marie Mazzarese, Beijing (CN); Jingyuan Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 91 days.

(21) Appl. No.: 14/671,952

(22) Filed: Mar. 27, 2015

(65) Prior Publication Data

US 2015/0200760 A1     Jul. 16, 2015

Related U.S. Application Data

(63) Continuation of application No. PCT/CN2012/082449, filed on Sep. 29, 2012.

(51) Int. Cl.
*H04B 7/00* (2006.01)
*H04W 4/00* (2009.01)
(Continued)

(52) U.S. Cl.
CPC ......... *H04L 5/0053* (2013.01); *H04B 17/345* (2015.01); *H04L 1/00* (2013.01);
(Continued)

(58) Field of Classification Search
CPC ... H04B 1/50; H04B 1/52; H04B 1/56; H04B 7/2656; H04W 88/187
See application file for complete search history.

(56) References Cited

U.S. PATENT DOCUMENTS 9,456,372 B2 * 9/2016 Lee .................... H04L 25/0226
2008/0309632 A1 * 12/2008 Westerman ............ G06F 3/038
                                                    345/173
(Continued)

FOREIGN PATENT DOCUMENTS

CN        102300244 A      12/2011
CN        102684835 A       9/2012
(Continued)

OTHER PUBLICATIONS

"CSI configuration for UE with IMR and Subframe Subsets," 3GPP TSG RAN WG1, #70, Qingdao, China, R1-123464, 3rd Generation Partnership Project, Valbonne, France (Aug. 13-17, 2012).
(Continued)

*Primary Examiner* — Faruk Hamza
*Assistant Examiner* — Abu-Sayeed Haque
(74) *Attorney, Agent, or Firm* — Leydig, Voit & Mayer, Ltd.

(57) ABSTRACT

Embodiments of the present invention provide an interference measurement method, a base station, and a user equipment. The method includes: determining, by a user equipment, a first resource for interference measurement in a first subframe or determining a second resource not for interference measurement in the first subframe according to at least one of the zero-power CSI-RS configuration information, the non-zero power CSI-RS configuration information, and the CSI-IM configuration information; and performing interference measurement on the first resource, or performing no interference measurement on the second resource. The embodiments of the present invention can improve precision of interference measurement.

16 Claims, 3 Drawing Sheets

(51) Int. Cl.

| | | |
|---|---|---|
| *H04J 3/16* | (2006.01) | |
| *H04L 5/00* | (2006.01) | |
| *H04W 24/08* | (2009.01) | |
| *H04L 1/00* | (2006.01) | |
| *H04W 24/00* | (2009.01) | |
| *H04B 17/345* | (2015.01) | |
| *H04W 24/10* | (2009.01) | |
| *H04W 72/12* | (2009.01) | |
| *H04W 72/02* | (2009.01) | |
| *H04W 88/02* | (2009.01) | |
| *H04W 88/08* | (2009.01) | |

(52) U.S. Cl.
CPC .......... *H04W 24/00* (2013.01); *H04W 24/08* (2013.01); *H04W 24/10* (2013.01); *H04W 72/1273* (2013.01); *H04W 72/02* (2013.01); *H04W 88/02* (2013.01); *H04W 88/08* (2013.01)

(56) References Cited

U.S. PATENT DOCUMENTS

| | | | | |
|---|---|---|---|---|
| 2009/0092059 | A1* | 4/2009 | Fu .................... | H04W 72/082 370/252 |
| 2012/0082052 | A1* | 4/2012 | Oteri .................. | H04W 24/10 370/252 |
| 2013/0044028 | A1* | 2/2013 | Lea .................... | H01Q 21/24 342/359 |
| 2013/0301434 | A1* | 11/2013 | Krishnamurthy ..... | H04L 1/0026 370/252 |

FOREIGN PATENT DOCUMENTS

| | | |
|---|---|---|
| EP | 2763480 A1 | 8/2014 |
| WO | WO 2012099319 A1 | 7/2012 |
| WO | WO 2013138810 A1 | 9/2013 |

OTHER PUBLICATIONS

"Interference Assumptions Based on Non-Zero Power CSI-RS," 3GPP TSG RAN WG1, #70, Qingdao, China, R1-123463, 3rd Generation Partnership Project, Valbonne, France (Aug. 13-17, 2012).

"Zero-Power CSI-RS Configurations for Interference Measurements in CoMP," 3GPP TSG-RAN WG1, #69, Prague, Czech Republic, R1-122078, 3rd Generation Partnership Project, Valbonne, France (May 21-25, 2012).

"CSI-RS based IMR in CoMP," 3GPP TSG-RAN WG1, #69, Prague, Czech Republic, R1-122324, 3rd Generation Partnership Project, Valbonne, France (May 21-25, 2012).

"Resources for Interference Measurements," 3GPP TSG RAN WG1 meeting #68bis, Jeju, Korea, R1-120983, $3^{rd}$ Generation Partnership Project, Valbonne, France (Mar. 26-30, 2012).

Consideration on interference measurement, 3GPP TSG RAN WG1 Meeting #68bis, Jeju, Korea, R1-121092, $3^{rd}$ Generation Partnership Project, Valbonne, France (Mar. 26-30, 2012).

"Consideration on Interference measurement RE configuration," 3GPP TSG RAN WG1 Meeting #68b, R1-121810, $3^{rd}$ Generation Partnership Project, Valbonne, France (Mar. 26-30, 2012).

Office Action and Search Report in corresponding Chinese Application No. 201280004206.0 (Dec. 20, 2016).

\* cited by examiner

US 9,774,432 B2

INTERFERENCE MEASUREMENT METHOD, BASE STATION AND USER EQUIPMENT

CROSS-REFERENCE

This application is a continuation of International Patent Application No. PCT/CN2012/082449, filed on Sep. 29, 2012, which is hereby incorporated by reference in its entirety.

TECHNICAL FIELD

Embodiments of the present invention relate to the field of communications technologies, and in particular, to an interference measurement method, a base station, and a user equipment.

BACKGROUND

In a radio communications system, in order for a user equipment (User Equipment, UE for short) to measure downlink channel state information (Channel State Information, CSI for short), a base station needs to send a certain reference signal to the UE in a coverage area for the purpose of downlink channel measurement. For example, in a Third Generation Partnership Project (the 3rd Generation Partnership Project, 3GPP for short) Long Term Evolution (Long Term Evolution, LTE for short) Release 11 (Release 11) protocol, in order for the user equipment to measure downlink channel state information (Channel State Information, CSI for short), the base station further needs to configure one or more channel state information interference measurement (Channel State Information-Interference Measurement, CSI-IM for short) resources for the UE, and the UE measures interference on the CSI-IM resources and calculates the CSI according to the measured interference.

In the prior art, to obtain higher user throughput, a coordinated multi-point transmission and reception (Coordinated Multiple Point transmission and reception, CoMP for short) technology may be applied in the communications system. The coordinated multi-point transmission and reception technology refers to that multiple access points provide data services for one or more users simultaneously. When coverage of a macro base station in the coordinated multi-point transmission and reception technology fully includes coverage of a micro base station, the user equipment (User Equipment, UE for short) can be served by both the macro base station and the micro base station in a specific region of a cell covered by the micro base station. When the UE is located in the cell covered by the micro base station and served by the micro base station, and the UE needs to measure the CSI presumed to exist when the UE is served by the macro base station, the UE needs to measure interference including micro base station interference according to the CSI-IM resources, and calculate the CSI according to measured interference result information.

However, on the CSI-IM resources, a signal received by the UE from the micro base station may be a data signal, and consequently, the interference measured by the UE according to the CSI-IM resources is not accurate.

SUMMARY

Embodiments of the present invention provide an interference measurement method, a base station, and a user equipment, which are used to improve accuracy of interference measurement.

According to a first aspect, an embodiment of the present invention provides an interference measurement method, including:

receiving, by a user equipment, at least one of zero-power channel state information reference signal CSI-RS configuration information, non-zero power CSI-RS configuration information, and channel state information interference measurement CSI-IM configuration information that are sent by a base station;

determining, by the user equipment, a first resource for interference measurement in a first subframe or determining a second resource not for interference measurement in the first subframe according to at least one of the zero-power CSI-RS configuration information, the non-zero power CSI-RS configuration information, and the CSI-IM configuration information; and performing, by the user equipment, interference measurement on the first resource in the first subframe, or, performing no interference measurement on the second resource in the first subframe.

In a first possible implementation manner, according to the first aspect, a specific implementation manner is that: the first subframe is a subframe for receiving downlink data, and the determining, by the user equipment, a second resource not for interference measurement in the first subframe according to at least one of the zero-power CSI-RS configuration information, the non-zero power CSI-RS configuration information, and the CSI-IM configuration information, includes:

determining, by the user equipment, existence of a CSI-IM resource in the subframe for receiving downlink data and existence of at least one resource element RE other than a zero-power CSI-RS resource in the CSI-IM resource according to the CSI-IM configuration information and the zero-power CSI-RS configuration information, so that the user equipment determines that the CSI-IM resource is the second resource not for interference measurement; or determining, by the user equipment, existence of a CSI-IM resource in the subframe for receiving downlink data and existence of at least one RE other than a non-zero power CSI-RS resource in the CSI-IM resource according to the CSI-IM configuration information and the non-zero power CSI-RS configuration information, so that the user equipment determines that the CSI-IM resource is the second resource not for interference measurement; or according to the CSI-IM configuration information, determining, by the user equipment, that a CSI-IM resource exists in the subframe for receiving downlink data, and determining that the CSI-IM resource is for receiving downlink data sent by the base station, so that the user equipment determines that the CSI-IM resource is the second resource not for interference measurement.

In a second possible implementation manner, according to the first possible implementation manner of the first aspect, a specific implementation manner is that: the performing, by the user equipment, no interference measurement on the second resource in the first subframe includes:

performing, by the user equipment, no interference measurement on the second resource in the subframe for receiving downlink data.

In a third possible implementation manner, according to the first aspect, a specific implementation manner is that: the first subframe is a candidate interference measurement reference resource subframe, and the determining, by the user equipment, a second resource not for interference measurement in the first subframe according to at least one of the zero-power CSI-RS configuration information, the non-zero power CSI-RS configuration information, and the CSI-IM configuration information, includes:

determining, by the user equipment, existence of a CSI-IM resource in the first subframe and existence of at least one RE, which is a non-zero power CSI-RS resource, in the CSI-IM resource according to the CSI-IM configuration information and the non-zero power CSI-RS configuration information, so that the user equipment determines that the CSI-IM resource is the second resource not for interference measurement.

In a fourth possible implementation manner, according to the first aspect, a specific implementation manner is that: the first subframe is a candidate interference measurement reference resource subframe, and the determining, by the user equipment, a first resource for interference measurement in the first subframe according to at least one of the zero-power CSI-RS configuration information, the non-zero power CSI-RS configuration information, and the CSI-IM configuration information, includes:

determining, by the user equipment, existence of a CSI-IM resource in the first subframe and nonexistence of any RE, which is a non-zero power CSI-RS resource, in the CSI-IM resource according to the CSI-IM configuration information and the non-zero power CSI-RS configuration information, so that the user equipment determines that the CSI-IM resource is the first resource for interference measurement.

In a fifth possible implementation manner, according to the first aspect, a specific implementation manner is that: the first subframe is a subframe not for receiving downlink data, and the determining, by the user equipment, a first resource for interference measurement in the first subframe according to at least one of the zero-power CSI-RS configuration information, the non-zero power CSI-RS configuration information, and the CSI-IM configuration information, includes:

determining, by the user equipment, existence of a CSI-IM resource in the subframe not for receiving downlink data and existence of at least one RE other than a zero-power CSI-RS resource in the CSI-IM resource according to the CSI-IM configuration information and the zero-power CSI-RS configuration information, so that the user equipment determines that the CSI-IM resource is the first resource for interference measurement.

In a sixth possible implementation manner, according to the fifth possible implementation manner of the first aspect, a specific implementation manner is that: the performing, by the user equipment, interference measurement on the first resource in the first subframe includes:

performing, by the user equipment, interference measurement on the first resource in the subframe not for receiving downlink data.

In a seventh possible implementation manner, according to the first aspect, a specific implementation manner is that: the first subframe is a subframe for receiving downlink data, and the determining, by the user equipment, a first resource for interference measurement in the first subframe according to at least one of the zero-power CSI-RS configuration information, the non-zero power CSI-RS configuration information, and the CSI-IM configuration information, includes:

determining, by the user equipment, existence of a CSI-IM resource in the subframe for receiving downlink data and existence of at least one RE, which is a zero-power CSI-RS resource, in the CSI-IM resource according to the CSI-IM configuration information and the zero-power CSI-RS configuration information, so that the user equipment determines that an RE, which is a zero-power CSI-RS resource, in the CSI-IM resource is the first resource for interference measurement; or according to the CSI-IM configuration information, determining, by the user equipment, that a CSI-IM resource exists in the subframe for receiving downlink data, and determining that at least one RE in the CSI-IM resource is not for receiving downlink data sent by the base station, so that the user equipment determines that the RE not for receiving downlink data sent by the base station in the CSI-IM resource is the first resource for interference measurement.

In an eighth possible implementation manner, according to the seventh possible implementation manner of the first aspect, a specific implementation manner is that: the performing, by the user equipment, interference measurement on the first resource in the first subframe includes:

performing, by the user equipment, interference measurement on the first resource in the subframe for receiving downlink data.

In a ninth possible implementation manner, according to the first aspect and any one of the first to eighth possible implementation manners of the first aspect, a specific implementation manner is that: before the determining a first resource for interference measurement in the first subframe or determining a second resource not for interference measurement in the first subframe, the method further includes:

receiving, by the user equipment, scheduling information sent by the base station; and determining, by the user equipment according to the scheduling information, information about the subframe for receiving downlink data.

In a tenth possible implementation manner, according to the first aspect and any one of the first to eighth possible implementation manners of the first aspect, a specific implementation manner is that: before the determining a first resource for interference measurement in the first subframe or determining a second resource not for interference measurement in the first subframe, the method further includes:

detecting, by the user equipment, scheduling information sent by the base station; and if the user equipment fails to detect the scheduling information, determining, by the user equipment, that a detected subframe is subframe not for receiving downlink data.

In an eleventh possible implementation manner, according to the first aspect and any one of the first to tenth possible implementation manners of the first aspect, a specific implementation manner is that: before the determining a first resource for interference measurement in the first subframe or determining a second resource not for interference measurement in the first subframe, the method further includes:

receiving, by the user equipment, interference measurement indication information sent by the base station, where the interference measurement indication information is used as an instruction of determining the first resource and performing interference measurement on the first resource in the subframe or an instruction of determining the second resource and performing no interference measurement on the second resource in the subframe.

In a twelfth possible implementation manner, according to the eleventh possible implementation manner, a specific implementation manner is that: the interference measurement indication information corresponds to at least one CSI-IM resource configured by the base station for the user equipment, or corresponds to at least one CSI process configured by the base station for the user equipment.

According to a second aspect, an embodiment of the present invention further provides another interference measurement method, including:

sending, by a base station, at least one of zero-power channel state information reference signal CSI-RS configuration information, non-zero power CSI-RS configuration information, and channel state information interference measurement CSI-IM configuration information to a user equipment, so that the user equipment determines a first resource for interference measurement in a first subframe or determines a second resource not for interference measurement in the first subframe according to at least one of the zero-power CSI-RS configuration information, the non-zero power CSI-RS configuration information, and the CSI-IM configuration information.

In a first possible implementation manner, according to the second aspect, a specific implementation manner is that: the method further includes:

sending, by the base station, scheduling information to the user equipment, so that the user equipment determines, according to the scheduling information, information about a subframe for receiving downlink data.

In a second possible implementation manner, according to the second aspect or the first possible implementation manner of the second aspect, a specific implementation manner is that: the method further includes:

sending, by the base station, interference measurement indication information to the user equipment, where the interference measurement indication information is used as an instruction of determining the first resource and performing interference measurement on the first resource in the subframe or an instruction of determining the second resource and performing no interference measurement on the second resource in the subframe.

In a third possible implementation manner, according to the second possible implementation manner, a specific implementation manner is that: the interference measurement indication information corresponds to at least one CSI-RS resource configured by the base station for the user equipment, or corresponds to at least one CSI process configured by the base station for the user equipment.

According to a third aspect, an embodiment of the present invention provides a user equipment, including:

a receiving module, configured to receive at least one of zero-power channel state information reference signal CSI-RS configuration information, non-zero power CSI-RS configuration information, and channel state information interference measurement CSI-IM configuration information that are sent by the base station;

a processing module, configured to determine a first resource for interference measurement in a first subframe or determine a second resource not for interference measurement in the first subframe according to at least one of the zero-power CSI-RS configuration information, the non-zero power CSI-RS configuration information, and the CSI-IM configuration information; and a measuring module, configured to perform interference measurement on the first resource in the first subframe, or, perform no interference measurement on the second resource in the first subframe.

In a first possible implementation manner, according to the third aspect, a specific implementation manner is that: the first subframe is a subframe for receiving downlink data, the processing module determines the second resource not for interference measurement in the first subframe according to at least one of the zero-power CSI-RS configuration information, the non-zero power CSI-RS configuration information, and the CSI-IM configuration information, and the processing module is specifically configured to:

determine existence of a CSI-IM resource in the subframe for receiving downlink data and existence of at least one resource element RE other than a zero-power CSI-RS resource in the CSI-IM resource according to the CSI-IM configuration information and the zero-power CSI-RS configuration information, so that the processing module determines that the CSI-IM resource is the second resource not for interference measurement; or determine existence of a CSI-IM resource in the subframe for receiving downlink data and existence of at least one RE other than a non-zero power CSI-RS resource in the CSI-IM resource according to the CSI-IM configuration information and the non-zero power CSI-RS configuration information, so that the processing module determines that the CSI-IM resource is the second resource not for interference measurement; or according to the CSI-IM configuration information, determine that a CSI-IM resource exists in the subframe for receiving downlink data, and determine that the CSI-IM resource is for receiving downlink data sent by the base station, so that the processing module determines that the CSI-IM resource is the second resource not for interference measurement.

In a second possible implementation manner, according to the first possible implementation manner of the third aspect, a specific implementation manner is that: the processing module is specifically configured to:

perform no interference measurement on the second resource in the subframe for receiving downlink data.

In a third possible implementation manner, according to the third aspect, a specific implementation manner is that: the first subframe is a candidate interference measurement reference resource subframe, the processing module determines a second resource not for interference measurement in the first subframe according to at least one of the zero-power CSI-RS configuration information, the non-zero power CSI-RS configuration information, and the CSI-IM configuration information, and the processing module is specifically configured to:

determine existence of a CSI-IM resource in the first subframe and existence of at least one RE, which is a non-zero power CSI-RS resource, in the CSI-IM resource according to the CSI-IM configuration information and the non-zero power CSI-RS configuration information, so that the processing module determines that the CSI-IM resource is the second resource not for interference measurement.

In a fourth possible implementation manner, according to the third aspect, a specific implementation manner is that: the first subframe is a candidate interference measurement reference resource subframe, the processing module determines a first resource for interference measurement in the first subframe according to at least one of the zero-power CSI-RS configuration information, the non-zero power CSI-RS configuration information, and the CSI-IM configuration information, and the processing module is specifically configured to:

determine existence of a CSI-IM resource in the first subframe and nonexistence of any RE, which is a non-zero power CSI-RS resource, in the CSI-IM resource according to the CSI-IM configuration information and the non-zero power CSI-RS configuration information, so that the processing module determines that the CSI-IM resource is the first resource for interference measurement.

In a fifth possible implementation manner, according to the third aspect, a specific implementation manner is that:

the first subframe is a subframe not for receiving downlink data, the processing module determines a first resource for interference measurement in the first subframe according to at least one of the zero-power CSI-RS configuration information, the non-zero power CSI-RS configuration information, and the CSI-IM configuration information, and the processing module is specifically configured to:

determine existence of a CSI-IM resource in the subframe not for receiving downlink data and existence of at least one RE other than a zero-power CSI-RS resource in the CSI-IM resource according to the CSI-IM configuration information and the zero-power CSI-RS configuration information, so that the processing module determines that the CSI-IM resource is the first resource for interference measurement.

In a sixth possible implementation manner, according to the fifth possible implementation manner of the third aspect, a specific implementation manner is that: the measuring module is specifically configured to:

perform interference measurement on the first resource in the subframe not for receiving downlink data.

In a seventh possible implementation manner, according to the third aspect, a specific implementation manner is that: the first subframe is a subframe for receiving downlink data, the processing module determines a first resource for interference measurement in the first subframe according to at least one of the zero-power CSI-RS configuration information, the non-zero power CSI-RS configuration information, and the CSI-IM configuration information, and the processing module is specifically configured to:

determine existence of a CSI-IM resource in the subframe for receiving downlink data and existence of at least one RE, which is a zero-power CSI-RS resource, in the CSI-IM resource according to the CSI-IM configuration information and the zero-power CSI-RS configuration information, so that the processing module determines that an RE, which is a zero-power CSI-RS resource, in the CSI-IM resource is the first resource for interference measurement; or according to the CSI-IM configuration information, determine that a CSI-IM resource exists in the subframe for receiving downlink data, and determine that at least one RE in the CSI-IM resource is not for receiving downlink data sent by the base station, so that the processing module determines that the RE not for receiving downlink data sent by the base station in the CSI-IM resource is the first resource for interference measurement.

In an eighth possible implementation manner, according to the seventh possible implementation manner of the third aspect, a specific implementation manner is that: the measuring module is specifically configured to:

perform interference measurement on the first resource in the subframe for receiving downlink data.

In a ninth possible implementation manner, according to the third aspect and any one of the first to eighth possible implementation manners of the third aspect, a specific implementation manner is that: before a first resource for interference measurement in the first subframe is determined or a second resource not for interference measurement in the first subframe is determined, the receiving module is further specifically configured to:

receive scheduling information sent by the base station; and determine, according to the scheduling information, information about the subframe for receiving downlink data.

In a tenth possible implementation manner, according to the third aspect and any one of the first to eighth possible implementation manners of the third aspect, a specific implementation manner is that: before a first resource for interference measurement in the first subframe is determined or a second resource not for interference measurement in the first subframe is determined, the receiving module is further specifically configured to:

detect scheduling information sent by the base station; and if the scheduling information is not detected, determine that a detected subframe is subframe not for receiving downlink data.

In an eleventh possible implementation manner, according to the third aspect and any one of the first to tenth possible implementation manners of the third aspect, a specific implementation manner is that: before a first resource for interference measurement in the first subframe is determined or a second resource not for interference measurement in the first subframe is determined, the receiving module is further specifically configured to:

receive interference measurement indication information sent by the base station, where the interference measurement indication information is used as an instruction of determining the first resource and performing interference measurement on the first resource in the subframe or an instruction of determining the second resource and performing no interference measurement on the second resource in the subframe.

In a twelfth possible implementation manner, according to the eleventh possible implementation manner, a specific implementation manner is that: the interference measurement indication information corresponds to at least one CSI-IM resource configured by the base station for the user equipment, or corresponds to at least one CSI process configured by the base station for the user equipment.

According to a fourth aspect, an embodiment of the present invention provides a base station, including:

a sending module, configured to send at least one of zero-power channel state information reference signal CSI-RS configuration information, non-zero power CSI-RS configuration information, and channel state information interference measurement CSI-IM configuration information to a user equipment, so that the user equipment determines a first resource for interference measurement in a first subframe or determines a second resource not for interference measurement in the first subframe according to at least one of the zero-power CSI-RS configuration information, the non-zero power CSI-RS configuration information, and the CSI-IM configuration information.

In a first possible implementation manner, according to the fourth aspect, a specific implementation manner is that: the sending module is further configured to:

send scheduling information to the user equipment, so that the user equipment determines, according to the scheduling information, information about a subframe for receiving downlink data.

In a second possible implementation manner, according to the fourth aspect or the first possible implementation manner of the fourth aspect, a specific implementation manner is that: the sending module is further specifically configured to:

send interference measurement indication information to the user equipment, where the interference measurement indication information is used as an instruction of determining the first resource and performing interference measurement on the first resource in the subframe or an instruction of determining the second resource and performing no interference measurement on the second resource in the subframe.

In a third possible implementation manner, according to the second possible implementation manner, a specific implementation manner is that: the interference measurement indication information corresponds to at least one CSI-RS resource configured by the base station for the user equipment, or corresponds to at least one CSI process configured by the base station for the user equipment.

According to a fifth aspect, an embodiment of the present invention provides a user equipment, including:

a receiver, configured to receive at least one of zero-power channel state information reference signal CSI-RS configuration information, non-zero power CSI-RS configuration information, and channel state information interference measurement CSI-IM configuration information that are sent by the base station; and a processor, configured to determine a first resource for interference measurement in a first subframe or determine a second resource not for interference measurement in the first subframe according to at least one of the zero-power CSI-RS configuration information, the non-zero power CSI-RS configuration information, and the CSI-IM configuration information, where the processor is further configured to perform interference measurement on the first resource in the first subframe, or, perform no interference measurement on the second resource in the first subframe.

In a first possible implementation manner, according to the fifth aspect, a specific implementation manner is that: the first subframe is a subframe for receiving downlink data, the processor determines a second resource not for interference measurement in the first subframe according to at least one of the zero-power CSI-RS configuration information, the non-zero power CSI-RS configuration information, and the CSI-IM configuration information, and the processor is specifically configured to:

determine existence of a CSI-IM resource in the subframe for receiving downlink data and existence of at least one resource element RE other than a zero-power CSI-RS resource in the CSI-IM resource according to the CSI-IM configuration information and the zero-power CSI-RS configuration information, so that the processor determines that the CSI-IM resource is the second resource not for interference measurement; or determine existence of a CSI-IM resource in the subframe for receiving downlink data and existence of at least one RE other than a non-zero power CSI-RS resource in the CSI-IM resource according to the CSI-IM configuration information and the non-zero power CSI-RS configuration information, so that the processor determines that the CSI-IM resource is the second resource not for interference measurement; or according to the CSI-IM configuration information, determine that a CSI-IM resource exists in the subframe for receiving downlink data, and determine that the CSI-IM resource is for receiving downlink data sent by the base station, so that the processor determines that the CSI-IM resource is the second resource not for interference measurement.

In a second possible implementation manner, according to the first possible implementation manner of the fifth aspect, a specific implementation manner is that: the processor is specifically configured to:

perform no interference measurement on the second resource in the subframe for receiving downlink data.

In a third possible implementation manner, according to the fifth aspect, a specific implementation manner is that: the first subframe is a candidate interference measurement reference resource subframe, the processor determines a second resource not for interference measurement in the first subframe according to at least one of the zero-power CSI-RS configuration information, the non-zero power CSI-RS configuration information, and the CSI-IM configuration information, and the processor is specifically configured to:

determine existence of a CSI-IM resource in the first subframe and existence of at least one RE, which is a non-zero power CSI-RS resource, in the CSI-IM resource according to the CSI-IM configuration information and the non-zero power CSI-RS configuration information, so that the processor determines that the CSI-IM resource is the second resource not for interference measurement.

In a fourth possible implementation manner, according to the fifth aspect, a specific implementation manner is that: the first subframe is a candidate interference measurement reference resource subframe, the processor determines a first resource for interference measurement in the first subframe according to at least one of the zero-power CSI-RS configuration information, the non-zero power CSI-RS configuration information, and the CSI-IM configuration information, and the processor is specifically configured to:

determine existence of a CSI-IM resource in the first subframe and nonexistence of any RE, which is a non-zero power CSI-RS resource, in the CSI-IM resource according to the CSI-IM configuration information and the non-zero power CSI-RS configuration information, so that the processor determines that the CSI-IM resource is the first resource for interference measurement.

In a fifth possible implementation manner, according to the fifth aspect, a specific implementation manner is that: the first subframe is a subframe not for receiving downlink data, the processor determines a first resource for interference measurement in the first subframe according to at least one of the zero-power CSI-RS configuration information, the non-zero power CSI-RS configuration information, and the CSI-IM configuration information, and the processor is specifically configured to:

determine existence of a CSI-IM resource in the subframe not for receiving downlink data and existence of at least one RE other than a zero-power CSI-RS resource in the CSI-IM resource according to the CSI-IM configuration information and the zero-power CSI-RS configuration information, so that the processor determines that the CSI-IM resource is the first resource for interference measurement.

In a sixth possible implementation manner, according to the fifth possible implementation manner of the fifth aspect, a specific implementation manner is that: the processor is further specifically configured to:

perform interference measurement on the first resource in the subframe not for receiving downlink data.

In a seventh possible implementation manner, according to the fifth aspect, a specific implementation manner is that: the first subframe is a subframe for receiving downlink data, the processor determines a first resource for interference measurement in the first subframe according to at least one of the zero-power CSI-RS configuration information, the non-zero power CSI-RS configuration information, and the CSI-IM configuration information, and the processor is specifically configured to:

determine existence of a CSI-IM resource in the subframe for receiving downlink data and existence of at least one RE, which is a zero-power CSI-RS resource, in the CSI-IM resource according to the CSI-IM configuration information and the zero-power CSI-RS configuration information, so that the processor determines that an RE, which is a zero-power CSI-RS resource, in the CSI-IM resource is the first resource for interference measurement; or according to the CSI-IM configuration information, determine that a CSI-IM resource exists in the subframe for receiving downlink data, and determine that at least one RE in the CSI-IM resource is not for receiving downlink data sent by the base station, so that the processor determines that the RE not for receiving downlink data sent by the base station in the CSI-IM resource is the first resource for interference measurement.

In an eighth possible implementation manner, according to the seventh possible implementation manner of the fifth aspect, a specific implementation manner is that: the processor is further specifically configured to:

perform interference measurement on the first resource in the subframe for receiving downlink data.

In a ninth possible implementation manner, according to the fifth aspect and any one of the first to eighth possible implementation manners of the fifth aspect, a specific implementation manner is that: before a first resource for interference measurement in the first subframe is determined or a second resource not for interference measurement in the first subframe is determined, the receiver is further specifically configured to:

receive scheduling information sent by the base station; and determine, according to the scheduling information, information about the subframe for receiving downlink data.

In a tenth possible implementation manner, according to the fifth aspect and any one of the first to eighth possible implementation manners of the fifth aspect, a specific implementation manner is that: before a first resource for interference measurement in the first subframe is determined or a second resource not for interference measurement in the first subframe is determined, the receiver is further specifically configured to:

detect scheduling information sent by the base station; and if the scheduling information is not detected, determine that a detected subframe is subframe not for receiving downlink data.

In an eleventh possible implementation manner, according to the fifth aspect and any one of the first to tenth possible implementation manners of the fifth aspect, a specific implementation manner is that: before a first resource for interference measurement in the first subframe is determined or a second resource not for interference measurement in the first subframe is determined, the receiver is further specifically configured to:

receive interference measurement indication information sent by the base station, where the interference measurement indication information is used as an instruction of determining the first resource and performing interference measurement on the first resource in the subframe or an instruction of determining the second resource and performing no interference measurement on the second resource in the subframe.

In a twelfth possible implementation manner, according to the eleventh possible implementation manner, a specific implementation manner is that: the interference measurement indication information corresponds to at least one CSI-IM resource configured by the base station for the user equipment, or corresponds to at least one CSI process configured by the base station for the user equipment.

According to a sixth aspect, an embodiment of the present invention provides a base station, including:

a sender, configured to send at least one of zero-power channel state information reference signal CSI-RS configuration information, non-zero power CSI-RS configuration information, and channel state information interference measurement CSI-IM configuration information to a user equipment, so that the user equipment determines a first resource for interference measurement in a first subframe or determines a second resource not for interference measurement in the first subframe according to at least one of the zero-power CSI-RS configuration information, the non-zero power CSI-RS configuration information, and the CSI-IM configuration information.

In a first possible implementation manner, according to the sixth aspect, a specific implementation manner is that: the sender is further configured to:

send scheduling information to the user equipment, so that the user equipment determines, according to the scheduling information, information about a subframe for receiving downlink data.

In a second possible implementation manner, according to the sixth aspect or the first possible implementation manner of the sixth aspect, a specific implementation manner is that: the sender is further specifically configured to:

send interference measurement indication information to the user equipment, where the interference measurement indication information is used as an instruction of determining the first resource and performing interference measurement on the first resource in the subframe or an instruction of determining the second resource and performing no interference measurement on the second resource in the subframe.

In a third possible implementation manner, according to the second possible implementation manner, a specific implementation manner is that: the interference measurement indication information corresponds to at least one CSI-RS resource configured by the base station for the user equipment, or corresponds to at least one CSI process configured by the base station for the user equipment.

In the interference measurement method, the base station, and the user equipment provided in the embodiments of the present invention, the user equipment determines a first resource for interference measurement in a first subframe or determines a second resource not for interference measurement in the first subframe according to at least one of zero-power CSI-RS configuration information, non-zero power CSI-RS configuration information, and CSI-IM configuration information; and the user equipment performs interference measurement on the first resource in the first subframe or performs no interference measurement on the second resource in the first subframe. The interference measurement and data receiving are not executed simultaneously, and the UE receives only interfering signals rather than data signals when measuring interference, so that the UE can measure interference accurately.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The interference measurement method in the embodiments of the present invention may be determined and discussed in the 3$^{rd}$ Generation Partnership Project (the 3$^{rd}$ Generation Partnership Project, 3GPP for short) Long Term Evolution (Long Term Evolution, LTE for short) Release 11 (Release 11), and is applicable to R11 and subsequent versions.

Figure 1:
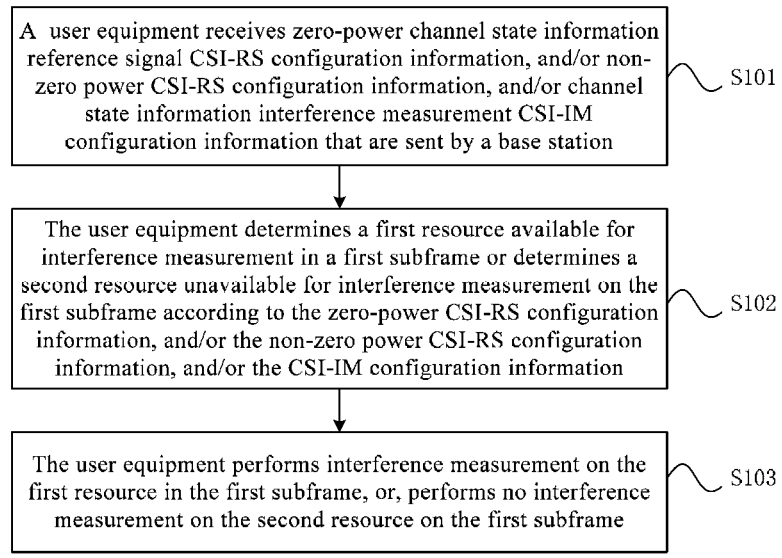
FIG. 1 is a schematic flowchart of an interference measurement method according to Embodiment 1 of the present invention.

FIG. 1 is a schematic flowchart of an interference measurement method according to Embodiment 1 of the present invention. As shown in FIG. 1, the entity for performing the embodiment of the present invention is a user equipment (User Equipment, UE for short). The interference measurement method provided in the embodiments of the present invention includes:

S101. A user equipment receives at least one of zero-power channel state information reference signal CSI-RS configuration information, non-zero power CSI-RS configuration information, and channel state information interference measurement CSI-IM configuration information that are sent by a base station.

S102. The user equipment determines a first resource for interference measurement in a first subframe or determines a second resource not for interference measurement in the first subframe according to at least one of the zero-power CSI-RS configuration information, the non-zero power CSI-RS configuration information, and the CSI-IM configuration information.

S103. The user equipment performs interference measurement on the first resource in the first subframe, or, performs no interference measurement on the second resource in the first subframe.

CSI-RS resource parameters configured by the base station for the UE in the embodiment of the present invention mainly include: a CSI-RS mapping location, which indicates resource elements (Resource Element, RE for short) to which a CSI-RS is mapped in a certain subframe; and a CSI-RS subframe configuration, which indicates subframes in which a CSI-RS of a specific UE is transmitted. CSI-RS configuration information that is already configured includes non-zero power CSI-RS configuration information, including the number of ports, a pilot pattern, a cycle, and a subframe offset; and zero-power CSI-RS configuration information, including a RE location, a cycle, a subframe offset, and so on.

In the 3GPP LTE Release 11 protocol, the base station further configures channel state information interference measurement (Channel State Information Interference Measurement, CSI-IM for short) configuration information for the UE, where the CSI-IM configuration information includes one or more CSI-IM resources REs for interference measurement.

The user equipment may determine a first resource for interference measurement in a first subframe or determine a second resource not for interference measurement in the first subframe according to at least one of the zero-power CSI-RS configuration information, the non-zero power CSI-RS configuration information, and the CSI-IM configuration information. For example, the user equipment determines existence of a CSI-IM resource in the subframe for receiving downlink data and existence of at least one resource element RE other than a zero-power CSI-RS resource in the CSI-IM resource according to the CSI-IM configuration information and the zero-power CSI-RS configuration information, so that the user equipment determines that the CSI-IM resource is the second resource not for interference measurement and capable of receiving downlink data normally; the user equipment determines existence of a CSI-IM resource in the subframe not for receiving downlink data and existence of at least one resource element RE other than a zero-power CSI-RS resource in the CSI-IM resource according to the CSI-IM configuration information and the zero-power CSI-RS configuration information, so that the user equipment determines that the CSI-IM resource is the first resource for interference measurement and does not receive downlink data on the first resource.

The user equipment may perform interference measurement on the first resource in the first subframe, or perform no interference measurement on the second resource in the first subframe.

In the interference measurement method provided in the embodiment of the present invention, the user equipment determines a first resource for interference measurement in a first subframe or determines a second resource not for interference measurement in the first subframe according to at least one of zero-power CSI-RS configuration information, non-zero power CSI-RS configuration information, and CSI-IM configuration information; and the user equipment performs interference measurement on the first resource in the first subframe or performs no interference measurement on the second resource in the first subframe. The interference measurement and data receiving are not executed simultaneously, and the UE receives only interfering signals rather than data signals when measuring interference, so that the UE can measure interference accurately.

The following gives an example to describe that the user equipment determines a second resource not for interference measurement in the first subframe according to at least one of the zero-power CSI-RS configuration information, the non-zero power CSI-RS configuration information, and the CSI-IM configuration information when the first subframe is a subframe for receiving downlink data.

In a possible implementation manner, the user equipment may determine existence of a CSI-IM resource in the subframe for receiving downlink data according to the CSI-IM configuration information and determine existence of at least one resource element RE other than a zero-power CSI-RS resource in the CSI-IM resource according to the zero-power CSI-RS configuration information, so that the user equipment determines that the CSI-IM resource is the second resource not for interference measurement, where the second resource may receive downlink data.

In another possible implementation manner, the user equipment determines existence of a CSI-IM resource in the subframe for receiving downlink data according to the CSI-IM configuration information and determines existence of at least one RE other than a non-zero power CSI-RS resource in the CSI-IM resource according to the non-zero power CSI-RS configuration information, so that the user equipment determines that the CSI-IM resource is the second resource not for interference measurement, where the second resource may receive downlink data.

In another possible implementation manner, according to the CSI-IM configuration information, the user equipment determines that a CSI-IM resource exists in the subframe for receiving downlink data, and determines that the CSI-IM resource is for receiving downlink data sent by the base station, so that the user equipment determines that the CSI-IM resource is the second resource not for interference measurement, where the second resource may receive downlink data.

In the scenarios described above, the user equipment may perform interference measurement on the first resource in the subframe for receiving downlink data, or perform no interference measurement but receive data on the second resource in the subframe for receiving downlink data, that is, the interference measurement on the first resource and the data receiving on the second resource do not occur simultaneously.

Persons skilled in the art can understand that, when the first subframe is a subframe for receiving downlink data, the above example shall not be construed as a limitation to how the user equipment determines a second resource not for interference measurement in the first subframe according to at least one of the zero-power CSI-RS configuration information, the non-zero power CSI-RS configuration information, and the CSI-IM configuration information.

In the embodiment of the present invention, when the first subframe is a subframe for receiving downlink data, the user equipment determines a second resource not for interference measurement in a first subframe according to at least one of the zero-power CSI-RS configuration information, the non-zero power CSI-RS configuration information, and the CSI-IM configuration information, and performs interference measurement on the first resource in the subframe for receiving downlink data or performs no interference measurement but receives data on the second resource in the subframe for receiving downlink data. Therefore, the UE receives only interfering signals rather than data signals when measuring interference, and the UE can measure interference accurately.

In addition, when the first subframe is a subframe for receiving downlink data, the determining, by the user equipment, a first resource for interference measurement in the first subframe according to at least one of the zero-power CSI-RS configuration information, the non-zero power CSI-RS configuration information, and the CSI-IM configuration information, includes the following implementation manner:

In a possible implementation manner, the user equipment determines existence of a CSI-IM resource in the subframe for receiving downlink data and existence of at least one RE, which is a zero-power CSI-RS resource, in the CSI-IM resource according to the CSI-IM configuration information and the zero-power CSI-RS configuration information, so that the user equipment determines that an RE, which is a zero-power CSI-RS resource, in the CSI-IM resource is the first resource for interference measurement.

In a specific implementation process, the user equipment determines existence of the CSI-IM resource in the subframe for receiving downlink data according to the CSI-IM configuration information and determines existence of at least one RE, which is a zero-power CSI-RS resource, in the CSI-IM resource according to the zero-power CSI-RS configuration information, and therefore, the user equipment determines that the RE, which is a zero-power CSI-RS resource, in the CSI-IM resource is the first resource for interference measurement, and performs interference measurement on the first resource. The user equipment may perform interference measurement on the first resource in the subframe for receiving downlink data.

In another possible implementation manner, according to the CSI-IM configuration information, the user equipment determines that a CSI-IM resource exists in the subframe for receiving downlink data, and determines that at least one RE in the CSI-IM resource is not for receiving downlink data sent by the base station, so that the user equipment determines that the RE not for receiving downlink data sent by the base station in the CSI-IM resource is the first resource for interference measurement.

In a specific implementation process, when the user equipment determines, according to the CSI-IM configuration information, that at least one RE in the CSI-IM resource is not for receiving downlink data sent by the base station, the user equipment determines that the RE not for receiving downlink data sent by the base station in the CSI-IM resource is the first resource for interference measurement, that is, performs only interference measurement but receives no downlink data.

In the embodiment of the present invention, when the first subframe is a subframe not for receiving downlink data, the user equipment determines existence of a CSI-IM resource in the subframe for receiving downlink data and existence of at least one RE, which is a zero-power CSI-RS resource, in the CSI-IM resource, and therefore, the user equipment determines that the RE, which is a zero-power CSI-RS resource, in the CSI-IM resource is the first resource for interference measurement. Alternatively, according to the CSI-IM configuration information, the user equipment determines existence of a CSI-IM resource in the subframe for receiving downlink data and determines that at least one RE in the CSI-IM resource is not for receiving downlink data sent by the base station, and therefore, the user equipment determines that the RE not for receiving downlink data sent by the base station in the CSI-IM resource is the first resource for interference measurement. In this way, the UE receives only interfering signals rather than data signals when measuring interference, and the UE can measure interference accurately.

Based on the embodiment shown in FIG. 1, when the first subframe is a candidate interference measurement reference resource subframe, the determining, by the user equipment, a second resource not for interference measurement in the first subframe or determining a first resource for interference measurement in the first subframe according to at least one of the zero-power CSI-RS configuration information, the non-zero power CSI-RS configuration information, and the CSI-IM configuration information, may specifically include the following implementation manners:

In a possible implementation manner, the user equipment determines existence of a CSI-IM resource in the first subframe and existence of at least one RE, which is a non-zero power CSI-RS resource, in the CSI-IM resource according to the CSI-IM configuration information and the non-zero power CSI-RS configuration information, so that the user equipment determines that the CSI-IM resource is the second resource not for interference measurement.

In a specific implementation process, if the first subframe is a candidate interference measurement reference resource, that is, if the first subframe is available for interference measurement, the user equipment determines existence of a CSI-IM resource in the first subframe according to the CSI-IM configuration information, and determines existence of at least one RE, which is a non-zero power CSI-RS resource, in the CSI-IM resource according to the non-zero power CSI-RS configuration information, so that the user equipment determines that the CSI-IM resource is the second resource not for interference measurement.

In another possible implementation manner, the user equipment determines existence of a CSI-IM resource in the first subframe and nonexistence of any RE, which is a non-zero power CSI-RS resource, in the CSI-IM resource according to the CSI-IM configuration information and the non-zero power CSI-RS configuration information, so that the user equipment determines that the CSI-IM resource is the first resource for interference measurement.

In a specific implementation process, if the first subframe is a candidate interference measurement reference resource, that is, if the first subframe is available for interference measurement, the user equipment determines existence of a CSI-IM resource in the first subframe according to the CSI-IM configuration information, and determines nonexistence of any RE, which is a non-zero power CSI-RS resource, in the CSI-IM resource according to the non-zero power CSI-RS configuration information, so that the user equipment determines that the CSI-IM resource is the first resource for interference measurement.

In the embodiment of the present invention, when the first subframe is a candidate interference measurement reference resource subframe, the user equipment determines a second resource not for interference measurement in the first subframe or determines a first resource for interference measurement in the first subframe according to at least one of the zero-power CSI-RS configuration information, the non-zero power CSI-RS configuration information, and the CSI-IM configuration information. Therefore, the UE receives only interfering signals rather than data signals when measuring interference, and the UE can measure interference accurately.

Based on the embodiment shown in FIG. 1, when the first subframe is a subframe not for receiving downlink data, the determining, by the user equipment, a first resource for interference measurement in the first subframe according to at least one of the zero-power CSI-RS configuration information, the non-zero power CSI-RS configuration information, and the CSI-IM configuration information, includes:

determining, by the user equipment, existence of a CSI-IM resource in the subframe not for receiving downlink data and existence of at least one RE other than a zero-power CSI-RS resource in the CSI-IM resource according to the CSI-IM configuration information and the zero-power CSI-RS configuration information, so that the user equipment determines that the CSI-IM resource is the first resource for interference measurement.

In a specific implementation process, when the first subframe is a subframe not for receiving downlink data, the user equipment determines existence of a CSI-IM resource in the subframe not for receiving downlink data according to the CSI-IM configuration information and determines existence of at least one RE other than a zero-power CSI-RS resource in the CSI-IM resource according to the zero-power CSI-RS configuration information, so that the user equipment determines that the CSI-IM resource is the first resource for interference measurement. Meanwhile, the user equipment performs interference measurement on the first resource in the subframe not for receiving downlink data.

In the embodiment of the present invention, when the first subframe is a subframe not for receiving downlink data, the user equipment determines existence of a CSI-IM resource in the subframe not for receiving downlink data and determines existence of at least one RE other than a zero-power CSI-RS resource in the CSI-IM resource, so that the user equipment determines that the CSI-IM resource is the first resource for interference measurement. In this way, the UE receives only interfering signals rather than data signals when measuring interference, and the UE can measure interference accurately.

In all the embodiments described above, before the user equipment determines a first resource for interference measurement in the first subframe or determines a second resource not for interference measurement in the first subframe, the following implementation manners are further included:

In a possible implementation manner, the user equipment receives scheduling information sent by the base station, and the user equipment determines, according to the scheduling information, information about a subframe for receiving downlink data.

As required by the measurement, the base station sends the scheduling information to the user equipment, and the user equipment may determine, according to the scheduling information, the subframe for receiving downlink data.

In another possible implementation manner, the user equipment detects the scheduling information sent by the base station. If the user equipment detects no scheduling information, the user equipment determines that the detected subframe is subframe not for receiving downlink data.

The user equipment may further detect the scheduling information sent by the base station. If the user equipment detects no scheduling information, the user equipment may determine that the detected subframe is the subframe not for receiving downlink data.

In the embodiment of the present invention, the user equipment receives scheduling information sent by the base station, and the user equipment can determine, according to the scheduling information, the subframe for receiving downlink data.

In all the embodiments described above, before the determining a first resource for interference measurement in the first subframe or determining a second resource not for interference measurement in the first subframe, the method further includes:

receiving, by the user equipment, interference measurement indication information sent by the base station, where the interference measurement indication information is used as an instruction of determining the first resource and performing interference measurement on the first resource in the subframe or an instruction of determining the second resource and performing no interference measurement on the second resource in the subframe.

In a specific implementation process, the interference measurement indication information may be notified to the UE through higher layer signaling or dynamic signaling, and each CSI-IM resource configured by the base station for the UE may have a piece of interference measurement indication information, which is used to instruct the UE to perform an interference measurement action that is based on the corresponding CSI-IM resource.

Meanwhile, each CSI process configured by the base station for the UE may have a piece of interference measurement indication information, which is used to instruct the UE to perform an interference measurement action that is based on the CSI-IM resource in the corresponding CSI process. The CSI process includes a channel part and an interference part required for measuring the CSI, where the channel part is indicated by a non-zero power CSI-RS, and the interference part is indicated by a CSI-IM.

The base station may also use a piece of interference measurement indication information to instruct the UE to perform an interference measurement action that is based on at least one CSI-IM resource or based on a CSI-IM resource in at least one CSI process respectively.

In the interference measurement method provided in the embodiment of the present invention, the UE receives the interference measurement indication information sent by the base station, so that the UE can determine the first resource and perform interference measurement on the first resource in the subframe, or determine the second resource and perform no interference measurement on the second resource in the subframe.

Figure 2:
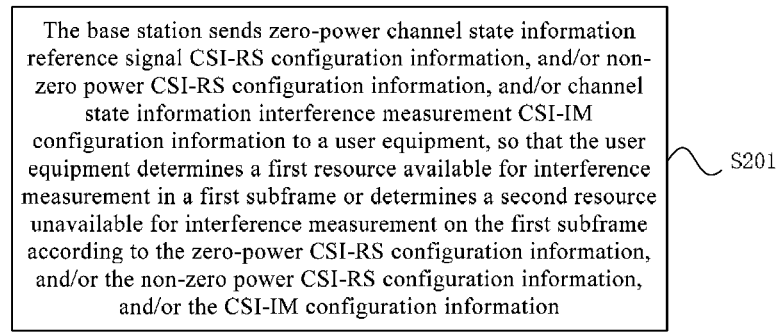
FIG. 2 is a schematic flowchart of an interference measurement method according to Embodiment 2 of the present invention.

FIG. 2 is a schematic flowchart of an interference measurement method according to Embodiment 2 of the present invention. As shown in FIG. 2, the entity for performing the embodiment of the present invention is a base station. The interference measurement method provided in the embodiments of the present invention includes:

S201. The base station sends at least one of zero-power channel state information reference signal CSI-RS configuration information, non-zero power CSI-RS configuration information, and channel state information interference measurement CSI-IM configuration information to a user equipment, so that the user equipment determines a first resource for interference measurement in a first subframe or determines a second resource not for interference measurement in the first subframe according to at least one of the zero-power CSI-RS configuration information, the non-zero power CSI-RS configuration information, and the CSI-IM configuration information.

When the base station requires the user equipment to report a measurement report of interference measurement, the base station may send at least one of the zero-power CSI-RS configuration information, the non-zero power CSI-RS configuration information, and the CSI-IM configuration information to the user equipment, and therefore, according to the configuration information, the user equipment can determine the first resource for interference measurement in the first subframe or determine the second resource not for interference measurement in the first subframe. In this way, the user equipment performs interference measurement on the first resource or receives data on the second resource, and the user equipment receives no data when measuring interference, and performs no interference measurement when receiving data.

In the interference measurement method provided in the embodiment of the present invention, the base station sends at least one of the zero-power CSI-RS configuration information, the non-zero power CSI-RS configuration information, and the CSI-IM configuration information to a user equipment, so that the user equipment determines the first resource for interference measurement in the first subframe or determines the second resource not for interference measurement in the first subframe according to at least one of the zero-power CSI-RS configuration information, the non-zero power CSI-RS configuration information, and the CSI-IM configuration information, and the UE receives only interfering signals rather than data signals when measuring interference, which makes the UE measure the interference accurately.

Based on the embodiment shown in FIG. 2, the base station sends the interference measurement indication information to the user equipment, where the interference measurement indication information is used as an instruction of determining the first resource and performing interference measurement on the first resource in the subframe or an instruction of determining the second resource and performing no interference measurement on the second resource in the subframe.

In a specific implementation process, the base station may notify the interference measurement indication information to the UE through higher layer signaling or dynamic signaling, and each CSI-IM resource configured by the base station for the UE may have a piece of interference measurement indication information, which is used to instruct the UE to perform an interference measurement action that is based on the corresponding CSI-IM resource.

Meanwhile, each CSI process configured by the base station for the UE may have a piece of interference measurement indication information, which is used to instruct the UE to perform an interference measurement action that is based on the CSI-IM resource in the corresponding CSI process. The CSI process includes a channel part and an interference part required for measuring the CSI, where the channel part is indicated by a non-zero power CSI-RS, and the interference part is indicated by a CSI-IM.

The base station may also use the piece of interference measurement indication information to instruct the UE to perform an interference measurement action that is based on at least one CSI-IM resource or based on CSI-IM resources in at least one CSI process respectively.

In the interference measurement method provided in the embodiment of the present invention, the base station sends the interference measurement indication information to the UE, so that the UE can determine the first resource and perform interference measurement on the first resource in the subframe, or determine the second resource and perform no interference measurement on the second resource in the subframe.

Figure 3:
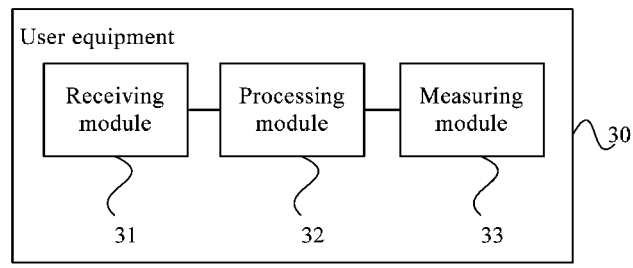
FIG. 3 is a structural diagram of a user equipment according to Embodiment 1 of the present invention.

FIG. 3 is a structural diagram of a user equipment according to Embodiment 1 of the present invention. As shown in FIG. 3, the user equipment 30 provided in the embodiment of the present invention includes a receiving module 31, a processing module 32, and a measuring module 33. The receiving module 31 is configured to receive at least one of zero-power channel state information reference signal CSI-RS configuration information, non-zero power CSI-RS configuration information, and channel state information interference measurement CSI-IM configuration information that are sent by the base station.

The processing module 32 is configured to determine a first resource for interference measurement in a first subframe or determine a second resource not for interference measurement in the first subframe according to at least one of the zero-power CSI-RS configuration information, the non-zero power CSI-RS configuration information, and the CSI-IM configuration information.

The measuring module 33 is configured to perform interference measurement on the first resource in the first subframe, or, perform no interference measurement on the second resource in the first subframe.

The user equipment in this embodiment may be configured to execute the method in the method embodiment shown in FIG. 1, and the implementation principles and the technical effects of the user equipment are similar to those of the method embodiment, and are not repeated here any further.

Further, the first subframe is a subframe for receiving downlink data, and the processing module 32 determines a second resource not for interference measurement in the first subframe according to at least one of the zero-power CSI-RS configuration information, the non-zero power CSI-RS configuration information, and the CSI-IM configuration information, and the processing module 32 is specifically configured to:

determine existence of a CSI-IM resource in the subframe for receiving downlink data and existence of at least one resource element RE other than, a zero-power CSI-RS resource, in the CSI-IM resource according to the CSI-IM configuration information and the zero-power CSI-RS configuration information, so that the processing module 32 determines that the CSI-IM resource is the second resource not for interference measurement; or determine existence of a CSI-IM resource in the subframe for receiving downlink data and existence of at least one RE other than, a non-zero power CSI-RS resource, in the CSI-IM resource according to the CSI-IM configuration information and the non-zero power CSI-RS configuration information, so that the processing module 32 determines that the CSI-IM resource is the second resource not for interference measurement; or according to the CSI-IM configuration information, determine that a CSI-IM resource exists in the subframe for receiving downlink data, and determine that the CSI-IM resource is for receiving downlink data sent by the base station, so that the processing module 32 determines that the CSI-IM resource is the second resource not for interference measurement.

Further, the processing module 32 is specifically configured to:

perform no interference measurement on the second resource in the subframe for receiving downlink data.

Further, the first subframe is a candidate interference measurement reference resource subframe, the processing module 32 determines a second resource not for interference measurement in the first subframe according to at least one of the zero-power CSI-RS configuration information, the non-zero power CSI-RS configuration information, and the CSI-IM configuration information, and the processing module 32 is specifically configured to:

determine existence of a CSI-IM resource in the first subframe and existence of at least one RE, which is a non-zero power CSI-RS resource, in the CSI-IM resource according to the CSI-IM configuration information and the non-zero power CSI-RS configuration information, so that the processing module 32 determines that the CSI-IM resource is the second resource not for interference measurement.

Further, the first subframe is a candidate interference measurement reference resource subframe, the processing module 32 determines a first resource for interference measurement in the first subframe according to at least one of the zero-power CSI-RS configuration information, the non-zero power CSI-RS configuration information, and the CSI-IM configuration information, and the processing module 32 is specifically configured to:

determine existence of a CSI-IM resource in the first subframe and nonexistence of any RE, which is a non-zero power CSI-RS resource, in the CSI-IM resource according to the CSI-IM configuration information and the non-zero power CSI-RS configuration information, so that the processing module 32 determines that the CSI-IM resource is the first resource for interference measurement.

Further, the first subframe is a subframe not for receiving downlink data, the processing module 32 determines a first resource for interference measurement in the first subframe according to at least one of the zero-power CSI-RS configuration information, the non-zero power CSI-RS configuration information, and the CSI-IM configuration information, and the processing module 32 is specifically configured to:

determine existence of a CSI-IM resource in the subframe not for receiving downlink data and existence of at least one RE other than a zero-power CSI-RS resource in the CSI-IM resource according to the CSI-IM configuration information and the zero-power CSI-RS configuration information, so that the processing module 32 determines that the CSI-IM resource is the first resource for interference measurement.

Further, the measuring module 33 is specifically configured to:

perform interference measurement on the first resource in the subframe not for receiving downlink data.

Further, the first subframe is a subframe for receiving downlink data, the processing module 32 determines a first resource for interference measurement in the first subframe according to at least one of the zero-power CSI-RS configuration information, the non-zero power CSI-RS configuration information, and the CSI-IM configuration information, and the processing module 32 is specifically configured to:

determine existence of a CSI-IM resource in the subframe for receiving downlink data and existence of at least one RE, which is a zero-power CSI-RS resource, in the CSI-IM resource according to the CSI-IM configuration information and the zero-power CSI-RS configuration information, so that the processing module 32 determines that an RE, which is a zero-power CSI-RS resource, in the CSI-IM resource is the first resource for interference measurement; or according to the CSI-IM configuration information, determine that a CSI-IM resource exists in the subframe for receiving downlink data, and determine that at least one RE in the CSI-IM resource is not for receiving downlink data sent by the base station, so that the processing module 32 determines that the RE not for receiving downlink data sent by the base station in the CSI-IM resource is the first resource for interference measurement.

Further, the measuring module 33 is specifically configured to:

perform interference measurement on the first resource in the subframe for receiving downlink data.

Further, before a first resource for interference measurement in the first subframe is determined or a second resource not for interference measurement in the first subframe is determined, the receiving module 31 is further specifically configured to:

receive scheduling information sent by the base station; and determine, according to the scheduling information, information about the subframe for receiving downlink data.

Further, before a first resource for interference measurement in the first subframe is determined or a second resource not for interference measurement in the first subframe is determined, the receiving module 31 is further specifically configured to:

detect scheduling information sent by the base station; and if the scheduling information is not detected, determine that a detected subframe is subframe not for receiving downlink data.

Further, before a first resource for interference measurement in the first subframe is determined or a second resource not for interference measurement in the first subframe is determined, the receiving module 31 is further specifically configured to:

receive interference measurement indication information sent by the base station, where the interference measurement indication information is used as an instruction of determining the first resource and performing interference measurement on the first resource in the subframe or an instruction of determining the second resource and performing no interference measurement on the second resource in the subframe.

Further, the interference measurement indication information corresponds to at least one CSI-IM resource configured by the base station for the user equipment, or corresponds to at least one CSI process configured by the base station for the user equipment.

The user equipment in this embodiment may be configured to execute the method in the method embodiment described above, and the implementation principles and the technical effects of the user equipment are similar to those of the method embodiment, and are not repeated here any further.

Figure 4:
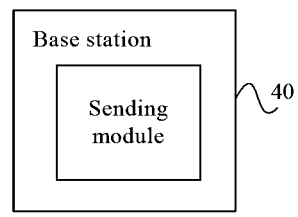
FIG. 4 is a schematic structural diagram of a base station according to Embodiment 1 of the present invention.

FIG. 4 is a schematic structural diagram of a base station according to Embodiment 1 of the present invention. As shown in FIG. 4, the base station 40 provided in the embodiment of the present invention includes a sending module 41. The sending module 41 is configured to send at least one of zero-power CSI-RS configuration information, non-zero power CSI-RS configuration information, and CSI-IM configuration information to a user equipment, so that the user equipment determines a first resource for interference measurement in a first subframe or determines a second resource not for interference measurement in the first subframe according to at least one of the zero-power CSI-RS configuration information, the non-zero power CSI-RS configuration information, and the CSI-IM configuration information.

The base station in this embodiment may be configured to execute the method in the method embodiment shown in FIG. 2, and the implementation principles and the technical effects of the base station are similar to those of the method embodiment, and are not repeated here any further.

Further, the sending module 41 is further configured to:
send scheduling information to the user equipment, so that the user equipment determines, according to the scheduling information, information about a subframe for receiving downlink data.

Further, the sending module 41 is further specifically configured to:
send interference measurement indication information to the user equipment, where the interference measurement indication information is used as an instruction of determining the first resource and performing interference measurement on the first resource in the subframe or an instruction of determining the second resource and performing no interference measurement on the second resource in the subframe.

Further, the interference measurement indication information corresponds to at least one CSI-RS resource configured by the base station for the user equipment, or corresponds to at least one CSI process configured by the base station for the user equipment.

The base station in this embodiment may be configured to execute the method in the method embodiment described above, and the implementation principles and the technical effects of the base station are similar to those of the method embodiment, and are not repeated here any further.

Figure 5:
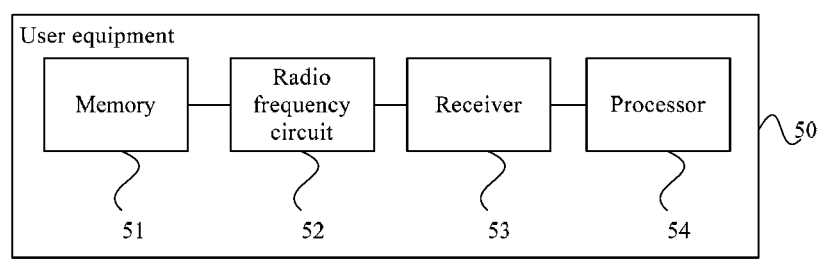
FIG. 5 is a schematic structural diagram of a user equipment according to Embodiment 2 of the present invention.

FIG. 5 is a schematic structural diagram of a user equipment according to Embodiment 2 of the present invention. As shown in FIG. 5, the user equipment 50 provided in the embodiment of the present invention includes at least one memory 51, at least one RF (Radio Frequency, radio frequency, RF for short) circuit 52, at least one receiver 53, and a processor 54. The memory 51 may include a high-speed random access memory, a non-volatile solid storage device, and so on. The radio frequency circuit 52 is configured to receive a baseband signal from an antenna and send a baseband signal by using the antenna. The receiver 53 is configured to receive at least one of zero-power channel state information reference signal CSI-RS configuration information, non-zero power CSI-RS configuration information, and channel state information interference measurement CSI-IM configuration information that are sent by a base station. The processor 54 is configured to determine a first resource for interference measurement in a first subframe or determine a second resource not for interference measurement in the first subframe according to at least one of the zero-power CSI-RS configuration information, the non-zero power CSI-RS configuration information, and the CSI-IM configuration information. The processor 54 is further configured to perform interference measurement on the first resource in the first subframe, or, perform no interference measurement on the second resource in the first subframe.

The user equipment in this embodiment may be configured to execute the method in the method embodiment shown in FIG. 1, and the implementation principles and the technical effects of the user equipment are similar to those of the method embodiment, and are not repeated here any further.

Further, the first subframe is a subframe for receiving downlink data, the processor 54 determines a second resource not for interference measurement in the first subframe according to at least one of the zero-power CSI-RS configuration information, the non-zero power CSI-RS configuration information, and the CSI-IM configuration information, and the processor 54 is specifically configured to:
determine existence of a CSI-IM resource in the subframe for receiving downlink data and existence of at least one resource element RE other than a zero-power CSI-RS resource in the CSI-IM resource according to the CSI-IM configuration information and the zero-power CSI-RS configuration information, so that the processor 54 determines that the CSI-IM resource is the second resource not for interference measurement; or
determine existence of a CSI-IM resource in the subframe for receiving downlink data and existence of at least one RE other than a non-zero power CSI-RS resource in the CSI-IM resource according to the CSI-IM configuration information and the non-zero power CSI-RS configuration information, so that the processor 54 determines that the CSI-IM resource is the second resource not for interference measurement; or
according to the CSI-IM configuration information, determine that a CSI-IM resource exists in the subframe for receiving downlink data, and determine that the CSI-IM resource is for receiving downlink data sent by the base station, so that the processor 54 determines that the CSI-IM resource is the second resource not for interference measurement.

Further, the processor 54 is specifically configured to:
perform no interference measurement on the second resource in the subframe for receiving downlink data.

Further, the first subframe is a candidate interference measurement reference resource subframe, the processor 54 determines a second resource not for interference measurement in the first subframe according to at least one of the zero-power CSI-RS configuration information, the non-zero power CSI-RS configuration information, and the CSI-IM configuration information, and the processor 54 is specifically configured to:

determine existence of a CSI-IM resource in the first subframe and existence of at least one RE, which is a non-zero power CSI-RS resource, in the CSI-IM resource according to the CSI-IM configuration information and the non-zero power CSI-RS configuration information, so that the processor 54 determines that the CSI-IM resource is the second resource not for interference measurement.

Further, the first subframe is a candidate interference measurement reference resource subframe, the processor 54 determines a first resource for interference measurement in the first subframe according to at least one of the zero-power CSI-RS configuration information, the non-zero power CSI-RS configuration information, and the CSI-IM configuration information, and the processor 54 is specifically configured to:

determine existence of a CSI-IM resource in the first subframe and nonexistence of any RE, which is a non-zero power CSI-RS resource, in the CSI-IM resource according to the CSI-IM configuration information and the non-zero power CSI-RS configuration information, so that the processor 54 determines that the CSI-IM resource is the first resource for interference measurement.

Further, the first subframe is a subframe not for receiving downlink data, the processor 54 determines a first resource for interference measurement in the first subframe according to at least one of the zero-power CSI-RS configuration information, the non-zero power CSI-RS configuration information, and the CSI-IM configuration information, and the processor 54 is specifically configured to:

determine existence of a CSI-IM resource in the subframe not for receiving downlink data and existence of at least one RE other than a zero-power CSI-RS resource in the CSI-IM resource according to the CSI-IM configuration information and the zero-power CSI-RS configuration information, so that the processor 54 determines that the CSI-IM resource is the first resource for interference measurement.

Further, the processor 54 is further specifically configured to:

perform interference measurement on the first resource in the subframe not for receiving downlink data.

Further, the first subframe is a subframe for receiving downlink data, the processor 54 determines a first resource for interference measurement in the first subframe according to at least one of the zero-power CSI-RS configuration information, the non-zero power CSI-RS configuration information, and the CSI-IM configuration information, and the processor 54 is specifically configured to:

determine existence of a CSI-IM resource in the subframe for receiving downlink data and existence of at least one RE, which is a zero-power CSI-RS resource, in the CSI-IM resource according to the CSI-IM configuration information and the zero-power CSI-RS configuration information, so that the processor 54 determines that an RE, which is a zero-power CSI-RS resource, in the CSI-IM resource is the first resource for interference measurement; or according to the CSI-IM configuration information, determine that a CSI-IM resource exists in the subframe for receiving downlink data, and determine that at least one RE in the CSI-IM resource is not for receiving downlink data sent by the base station, so that the processor 54 determines that the RE not for receiving downlink data sent by the base station in the CSI-IM resource is the first resource for interference measurement.

Further, the processor 54 is further specifically configured to:

perform interference measurement on the first resource in the subframe for receiving downlink data.

Further, before a first resource for interference measurement in the first subframe is determined or a second resource not for interference measurement in the first subframe is determined, the receiver 53 is further specifically configured to:

receive scheduling information sent by the base station; and determine, according to the scheduling information, information about the subframe for receiving downlink data.

Further, before a first resource for interference measurement in the first subframe is determined or a second resource not for interference measurement in the first subframe is determined, the receiver 53 is further specifically configured to:

detect scheduling information sent by the base station; and if the scheduling information is not detected, determine that a detected subframe is subframe not for receiving downlink data.

Further, before a first resource for interference measurement in the first subframe is determined or a second resource not for interference measurement in the first subframe is determined, the receiver 53 is further specifically configured to:

receive interference measurement indication information sent by the base station, where the interference measurement indication information is used as an instruction of determining the first resource and performing interference measurement on the first resource in the subframe or an instruction of determining the second resource and performing no interference measurement on the second resource in the subframe.

Further, the interference measurement indication information corresponds to at least one CSI-IM resource configured by the base station for the user equipment, or corresponds to at least one CSI process configured by the base station for the user equipment.

The user equipment in this embodiment may be configured to execute the method in the method embodiment described above, and the implementation principles and the technical effects of the user equipment are similar to those of the method embodiment, and are not repeated here any further.

Figure 6:
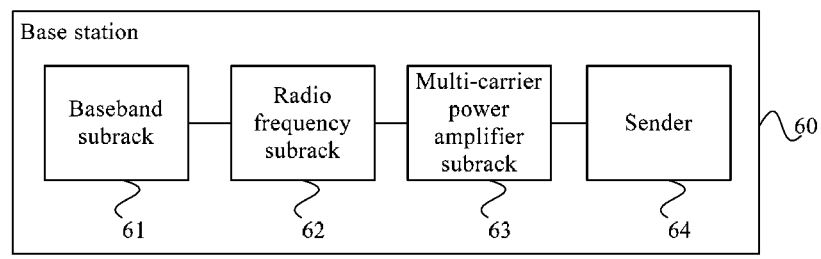
FIG. 6 is a schematic structural diagram of a base station according to Embodiment 2 of the present invention.

FIG. 6 is a schematic structural diagram of a base station according to Embodiment 2 of the present invention. As shown in FIG. 6, the base station 60 provided in the embodiment of the present invention includes a baseband subrack 61, a radio frequency subrack 62, a multi-carrier power amplifier subrack 63, and a sender 64. The baseband subrack 61 primarily handles dedicated and common channels to a UE, and is formed by a radio network controller, a main processor group, and an asynchronous transfer mode network. The radio frequency subrack 62 is formed by multiple radio frequency units, and can implement digital/analog conversion, radio frequency signal modulation, and carrier aggregation and splitting. The multi-carrier power amplifier subrack 63 is configured to amplify power. The sender 64 is configured to send at least one of zero-power CSI-RS configuration information, non-zero power CSI-RS configuration information, and CSI-IM configuration information to a user equipment, so that the user equipment determines a first resource for interference measurement in a first subframe or determines a second resource not for interference measurement in the first subframe according to at least one of the zero-power CSI-RS configuration information, the non-zero power CSI-RS configuration information, and the CSI-IM configuration information.

The base station in this embodiment may be configured to execute the method in the method embodiment shown in FIG. 2, and the implementation principles and the technical effects of the base station are similar to those of the method embodiment, and are not repeated here any further.

Further, the sender 64 is further configured to:

send scheduling information to the user equipment, so that the user equipment determines, according to the scheduling information, information about a subframe for receiving downlink data.

Further, the sender 64 is further specifically configured to:

send interference measurement indication information to the user equipment, where the interference measurement indication information is used as an instruction of determining the first resource and performing interference measurement on the first resource in the subframe or an instruction of determining the second resource and performing no interference measurement on the second resource in the subframe.

Further, the interference measurement indication information corresponds to at least one CSI-RS resource configured by the base station for the user equipment, or corresponds to at least one CSI process configured by the base station for the user equipment.

The base station in this embodiment may be configured to execute the method in the method embodiment described above, and the implementation principles and the technical effects of the base station are similar to those of the method embodiment, and are not repeated here any further.

Persons of ordinary skill in the art may understand that, all or a part of the steps of the foregoing method embodiments may be implemented by a program instructing relevant hardware. The foregoing programs may be stored in a computer readable storage medium. When the program runs, the steps of the forgoing method embodiments are performed. The foregoing storage medium includes various media capable of storing program code, such as a ROM, a RAM, a magnetic disk, and an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, as long as such modifications or replacements do not cause the essence of corresponding technical solutions to depart from the scope of the technical solutions of the embodiments of the present invention.

The invention claimed is:

1. An interference measurement method, comprising:
receiving, by a user equipment, at least one of zero-power channel state information reference signal (CSI-RS) configuration information, non-zero power CSI-RS configuration information, and channel state information interference measurement (CSI-IM) configuration information that are sent by a base station;
determining, by the user equipment, a first resource for interference measurement in a first subframe or determining a second resource not for interference measurement in the first subframe according to at least one of the zero-power CSI-RS configuration information, the non-zero power CSI-RS configuration information, and the CSI-IM configuration information; and
performing, by the user equipment, the interference measurement on the first resource in the first subframe when the first resource of the first subframe is not used to receive downlink data, or, performing no interference measurement on the second resource in the first subframe when the first subframe is receiving the downlink data.

2. The method according to claim 1, wherein the first subframe is a subframe for receiving downlink data, and determining the second resource not for the interference measurement in the first subframe, further comprises one of the following:
determining, by the user equipment, existence of a CSI-IM resource exists in the subframe for receiving the downlink data and at least one resource element (RE) other than a zero-power CSI-RS resource exists in the CSI-IM resource according to the CSI-IM configuration information and the zero-power CSI-RS configuration information, so that the user equipment determines that the CSI-IM resource is the second resource not for the interference measurement;
determining, by the user equipment, the CSI-IM resource in the subframe for receiving the downlink data and at least one RE other than a non-zero power CSI-RS resource exists in the CSI-IM resource according to the CSI-IM configuration information and the non-zero power CSI-RS configuration information, so that the user equipment determines that the CSI-IM resource is the second resource not for the interference measurement; and
according to the CSI-IM configuration information, determining, by the user equipment, that the CSI-IM resource exists in the subframe for receiving the downlink data, and determining that the CSI-IM resource is for receiving the downlink data sent by the base station, so that the user equipment determines that the CSI-IM resource is the second resource not for the interference measurement.

3. The method according to claim 1, further comprising:
sending, by the base station, scheduling information to the user equipment, to enable the user equipment to determine, according to the scheduling information, information about a subframe for receiving the downlink data.

4. The method according to claim 1, wherein: the first subframe is a candidate interference measurement reference resource subframe, and when determining the second resource not for the interference measurement in the first subframe, the method further comprises:
determining a CSI-IM resource exists in the first subframe and at least one resource element (RE), which is a non-zero power CSI-RS resource, exists in the CSI-IM resource according to the CSI-IM configuration information and the non-zero power CSI-RS configuration information; and determining that the CSI-IM resource is the second resource not for the interference measurement.

5. The method according to claim 1, wherein: the first subframe is a candidate interference measurement reference resource subframe, and when determining the first resource for the interference measurement in the first subframe, the method further comprises:
determining a CSI-IM resource exists in the first subframe and no resource element (RE), which is a non-zero power CSI-RS resource, exists in the CSI-IM resource according to the CSI-IM configuration information and the non-zero power CSI-RS configuration information; and determining that the CSI-IM resource is the first resource for the interference measurement.

6. The method according to claim 1, wherein: when the first subframe is a subframe not for receiving the downlink data, and when determining the first resource for interference measurement in the first subframe, the method further comprises:
   determining a CSI-IM resource exists in the subframe not for receiving the downlink data and at least one resource element (RE) other than a zero-power CSI-RS resource exists in the CSI-IM resource according to the CSI-IM configuration information and the zero-power CSI-RS configuration information; and determining that the CSI-IM resource is the first resource for the interference measurement.

7. A user equipment, comprising:
   a receiver, configured to receive at least one of zero-power channel state information reference signal (CSI-RS) configuration information, non-zero power CSI-RS configuration information, and channel state information interference measurement (CSI-IM) configuration information that are sent by a base station; and
   a processor, configured to determine a first resource for interference measurement in a first subframe or determine a second resource not for interference measurement in the first subframe according to at least one of the zero-power CSI-RS configuration information, the non-zero power CSI-RS configuration information, and the CSI-IM configuration information, wherein
   the processor is further configured to perform the interference measurement on the first resource in the first subframe when the first resource of the first subframe is not used to receive downlink data, or, perform no interference measurement on the second resource in the first subframe when the first subframe is receiving the downlink data.

8. The user equipment according to claim 7, wherein: when the first subframe is a subframe for receiving the downlink data, and when determining the second resource not for the interference measurement in the first subframe, the processor is further configured to implement one of the following:
   determining a CSI-IM resource exists in the subframe for receiving the downlink data and at least one resource element (RE) other than a zero-power CSI-RS resource exists in the CSI-IM resource according to the CSI-IM configuration information and the zero-power CSI-RS configuration information, so that the processor determines that the CSI-IM resource is the second resource not for the interference measurement;
   determining the CSI-IM resource exists in the subframe for receiving the downlink data and the at least one RE other than the non-zero power CSI-RS resource exists in the CSI-IM resource according to the CSI-IM configuration information and the non-zero power CSI-RS configuration information, so that the processor determines that the CSI-IM resource is the second resource not for the interference measurement; and
   according to the CSI-IM configuration information, determining that the CSI-IM resource exists in the subframe for receiving the downlink data, and determine that the CSI-IM resource is for receiving the downlink data sent by the base station, so that the processor determines that the CSI-IM resource is the second resource not for the interference measurement.

9. The user equipment according to claim 7, wherein: the first subframe is a candidate interference measurement reference resource subframe, and when determining the second resource not for the interference measurement in the first subframe, the processor is further configured to:
   determine a CSI-IM resource exists in the first subframe and at least one resource element (RE), which is a non-zero power CSI-RS resource, exists in the CSI-IM resource according to the CSI-IM configuration information and the non-zero power CSI-RS configuration information, so that the processor determines that the CSI-IM resource is the second resource not for the interference measurement.

10. The user equipment according to claim 7, wherein: the first subframe is a candidate interference measurement reference resource subframe, and when determining the first resource for the interference measurement in the first subframe, the processor is further configured to:
    determine a CSI-IM resource exists in the first subframe and no resource element (RE), which is a non-zero power CSI-RS resource, exists in the CSI-IM resource according to the CSI-IM configuration information and the non-zero power CSI-RS configuration information, so that the processor determines that the CSI-IM resource is the first resource for the interference measurement.

11. The user equipment according to claim 7, wherein: when the first subframe is a subframe not for receiving the downlink data, and when determining the first resource for interference measurement in the first subframe, the processor is further configured to:
    determine a CSI-IM resource exists in the subframe not for receiving the downlink data and at least one resource element (RE) other than a zero-power CSI-RS resource exists in the CSI-IM resource according to the CSI-IM configuration information and the zero-power CSI-RS configuration information, so that the processor determines that the CSI-IM resource is the first resource for the interference measurement.

12. The user equipment according to claim 7, wherein: when the first subframe is a subframe for receiving the downlink data, and when determining the first resource for the interference measurement in the first subframe, the processor is further configured to implement one of the following:
    determining a CSI-IM resource exists in the subframe for receiving the downlink data and at least one resource element (RE), which is a zero-power CSI-RS resource, exists in the CSI-IM resource according to the CSI-IM configuration information and the zero-power CSI-RS configuration information, so that the processor determines that an RE, which is a zero-power CSI-RS resource, in the CSI-IM resource is the first resource for the interference measurement; and
    according to the CSI-IM configuration information, determining that a CSI-IM resource exists in the subframe for receiving the downlink data, and determining that at least one RE in the CSI-IM resource is not for receiving the downlink data sent by the base station, so that the processor determines that the RE not for receiving the downlink data sent by the base station in the CSI-IM resource is the first resource for the interference measurement.

13. The user equipment according to claim 7, wherein: before the first resource for the interference measurement in the first subframe is determined or the second resource not for the interference measurement in the first subframe is determined, the receiver is further configured to:
- receive scheduling information sent by the base station; and
- determine, according to the scheduling information, information about the subframe for receiving the downlink data.

14. The user equipment according to claim 7, wherein: before the first resource for interference measurement in the first subframe is determined or the second resource not for interference measurement in the first subframe is determined, the receiver is further configured to:
- detect scheduling information sent by the base station; and
- when the scheduling information is not detected, determine that a detected subframe is a subframe not for receiving the downlink data.

15. The user equipment according to claim 7, wherein: before the first resource for interference measurement in the first subframe is determined or the second resource not for interference measurement in the first subframe is determined, the receiver is further configured to:
- receive interference measurement indication information sent by the base station, wherein the interference measurement indication information is used as an instruction of determining the first resource and performing the interference measurement on the first resource in the subframe or an instruction of determining the second resource and performing no interference measurement on the second resource in the subframe.

16. The user equipment according to claim 15, wherein the interference measurement indication information corresponds to at least one CSI-IM resource configured by the base station for the user equipment, or corresponds to at least one CSI process configured by the base station for the user equipment.

* * * * *

UNITED STATES PATENT AND TRADEMARK OFFICE
CERTIFICATE OF CORRECTION

PATENT NO. : 9,774,432 B2
APPLICATION NO. : 14/671952
DATED : September 26, 2017
INVENTOR(S) : Xia et al.

Page 1 of 1

It is certified that error appears in the above-identified patent and that said Letters Patent is hereby corrected as shown below:

Column 32, Line 15, "CSI-1M" should read -- CSI-IM --.

Signed and Sealed this
Nineteenth Day of June, 2018

Andrei Iancu
*Director of the United States Patent and Trademark Office*